United States Patent Office 2,710,071
Patented June 7, 1955

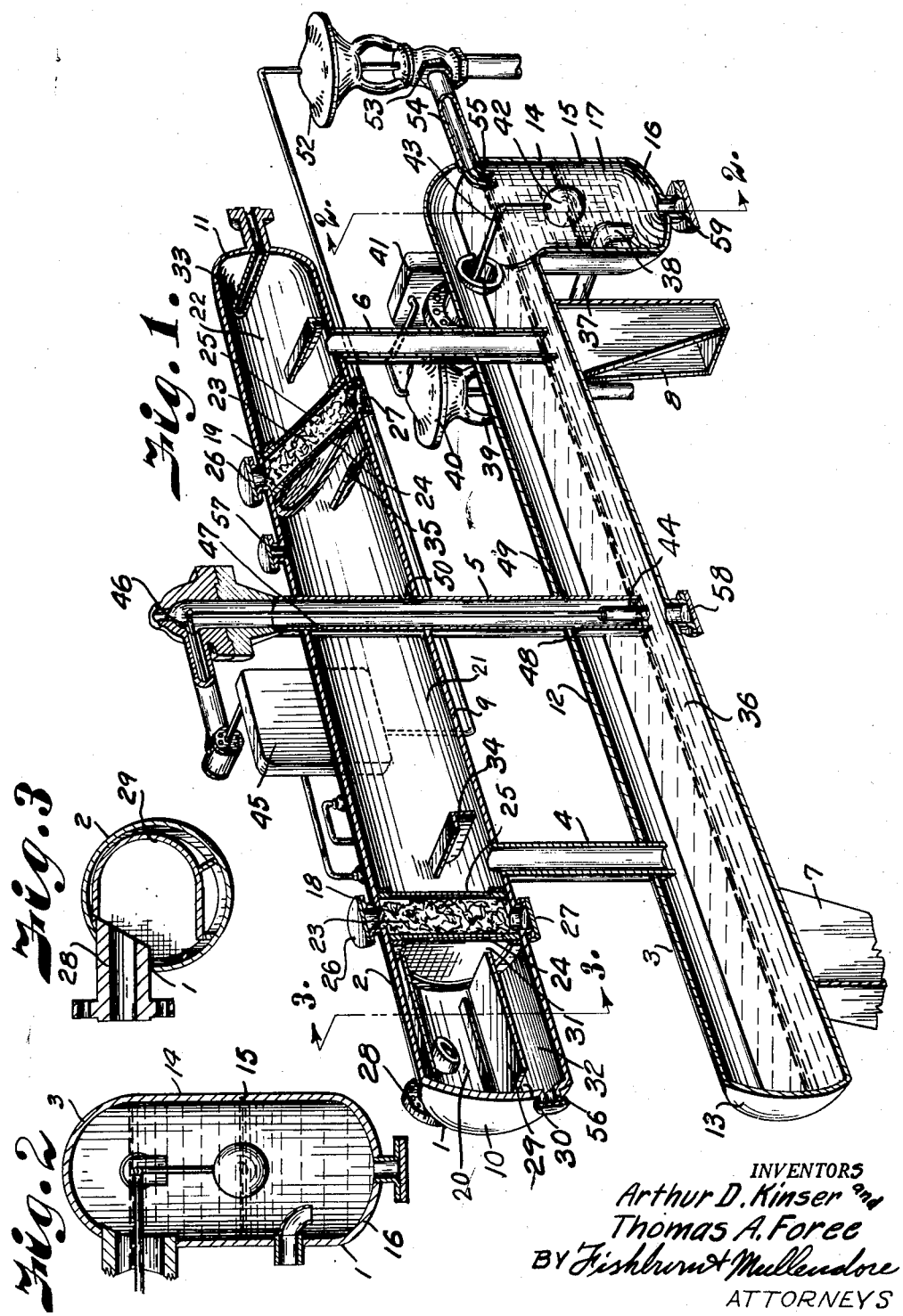

2,710,071

HORIZONTAL SEPARATOR FOR MIXED FLUIDS

Arthur D. Kinser and Thomas A. Foree, Oklahoma City, Okla., assignors to Black, Sivalls & Bryson, Inc., Kansas City, Mo., a corporation of Delaware Application November 17, 1951, Serial No. 256,866

5 Claims. (Cl. 183—2.7)

This invention relates to a separator for separating mixed fluids of different specific gravities; for example, the co-mingled gas, oil and water discharged from a producing well. The recent trend in separator construction is to those of the horizontal type because smaller and thinner walled vessels may be utilized for the separation of fluids under high pressures. The horizontal arrangement gives relatively shallow layers of the fluids with large surface areas to promote rapid and efficient separation of the respective components of the well flow. However, the shallow layers of separated liquids make it difficult to effect clean draw-off of the respective liquids.

It is therefore the principal object of the present invention to provide a horizontal type of separator with mechanism for effecting a clean draw-off of the respective liquids.

It is a further object of the invention to provide a horizontal type separator with a relatively deep well or sump into which the separated liquids are adapted to collect and stratify into relatively deep layers for facilitating separate draw-off of the respective liquids.

In accomplishing these and other objects of the invention, we have provided improved structure, the preferred form of which is illustrated in the accompanying drawings wherein:

Fig. 1 is a sectional perspective view of a horizontal separator embodying the features of the present invention.

Fig. 2 is a vertical section through the lower vessel at the discharge end thereof particularly illustrating the oil and water draw-off connections, the section being taken on the line 2—2, Fig. 1.

Fig. 3 is a cross section through the upper vessel of the separator taken on the line 3—3, of Fig. 1, and particularly illustrating the inlet for a stream of mixed fluids.

Referring more in detail to the drawings:

1 designates a horizontal type of separator constructed in accordance with the present invention and which includes upper and lower horizontally disposed vessels 2 and 3 that are interconnected by tubes 4, 5, and 6. The tubes 4, 5 and 6 provide support for the upper vessel from the lower vessel and the lower vessel is supported on legs 7 and 8.

The upper vessel 2 comprises an elongated cylindrical shell 9 closed at the ends by heads 10 and 11. The lower vessel 3 also includes an elongated cylindrical shell 12 closed at one end by a head 13, the other end terminating in a downward extension 14. The extension 14 has an annular wall 15 merging into the annular wall of the shell 12 and is closed at the bottom by a head 16 to form a well or sump 17 of substantial depth relative to the layers of liquids to be collected in the vessels. The upper vessel is divided transversely thereof by scrubbers 18 and 19 into an inlet compartment 20 at one end, an intermediate liquid and gas separating compartment 21, and a gas draw-off compartment 22 at the other end.

The scrubbers 18 and 19 each comprise a wall of fibrous material 23 supported between spaced screens 24 and 25. The scrubber 18 is arranged vertically of the upper vessel at a point between the head 10 and the tube 4 while the scrubber 19 is arranged at an angle with the lower portion sloping in the direction of the tube 6. The vessel is provided above and below each of the scrubbers with manholes 26 and 27 through which the material is inserted and removed.

The compartment 20 has a tangential inlet 28 through which the well fluids are discharged for circumvolution about the interior of the compartment under the direction of a baffle 29. The baffle 29 is of less length than the compartment so as to provide for outlets 30 and 31 for the separated liquid which are in connection with a compartment 32 that is provided under the baffle as best shown in Figs. 1 and 3.

The gas separated from the liquid passes through the scrubber and along the upper portion of the compartment 21 for discharge through the scrubber 19 into the gas compartment 22 where the gas is drawn off through a discharge connection 33. The separated liquids, on passing through the lower portion of the scrubber 18 flow under a baffle 34 and along the length of the separating compartment 35 up to a transverse partition 35.

The liquid passes out of the vessel 2 through the tube 4 and into the vessel 3 where the oil collects in an upper layer 36 and the water precipitates and flows along the bottom of the shell where it passes down the wall 15 and collects on the bottom of the sump 17. The well or sump 17 is provided with a water draw-off 37 that passes through the wall thereof and has a downturned inlet 38. Connected in the water drawoff pipe is a control valve 39 that is operated by a motor 40 under control of a valve mechanism 41 which is activated by an interface float 42. The float 42 is connected with the valve 41 through a lever mechanism indicated at 43. A level of the lighter liquid or oil is maintained within the lower vessel by means of a float 44 that operates a valve mechanism 45 through a rod and lever mechanism 46, the rod being contained within the tube 5. The tube 5 extends vertically through the upper vessel as shown in Fig. 1.

The pressure within the tube and vessels is equalized through a port 47 that connects with the gas space in the upper vessel and ports 48 and 49 in connection with the gas space in the lower vessel as shown in Fig. 1. Liquid may also drain from the upper vessel into the lower vessel through an opening 50 in the tube 5. The valve mechanism 45 controls flow of pressure medium to a motor 52 to actuate a control valve 53 in an oil draw-off duct 54 that connects with the sump 17 and has a downturned inlet 55 extending slightly below the level of the oil.

The tube 4 terminates within the gas space in the lower vessel; however, the tube 6 extends to the liquid level in the lower vessel so that any hydrocarbon liquids separating within the gas collecting compartment 22 may drain into the oil collecting in the lower vessel.

The upper and lower vessels may be provided with clean out openings 56, 57, 58 and 59 that are normally closed by suitable covers.

In operation, the flow from a well is discharged under substantially high pressure through the nozzle 28 where it is caused to circumvolve within the compartment 20 by reason of the inlet and baffle 29. The heavier liquids follow the baffle and wall of the vessel so that they are readily separated from the gas and pass through the scrubber 18 into the compartment 21. The gas flows through the scrubber 18 along the length of the compartment 21, and through the scrubber 19 into the gas collecting compartment 22. The gas reaching this compartment is relatively dry and is discharged through the outlet 33. Any liquid draining from the scrubber 19 and into the compartment 22 passes downwardly through the tube 6 and is discharged below the level of surface of liquid in the lower vessel.

The separated liquid flows from the upper vessel through the tube 4 and collects in the lower vessel, the water gravitating to the bottom and flowing along the length of the shell into the sump 17. The oil collects in a layer above the water. The surface level of the oil layer is maintained constant by operation of the discharge valve 53 under control of the float 44. The interface or water level in the sump is maintained by the float 42 which controls the water discharge valve so that the level of the water is maintained substantially constant. When the water discharge valve is open, the water passes out through the pipe 37 to a place of disposal. The oil discharge duct is connected by the pipe 54 with a suitable storage tank or gathering line (not shown).

With the separator constructed as described, it is obvious that while the layers of separated liquid in the horizontal vessel are relatively shallow, the layers of the separated liquids in the sump have substantial depth so as to accommodate the interface float and assure a separate and clean draw-off of the respective liquids.

What we claim and desire to secure by Letters Patent is:

1. A separator including elongated vessels horizontally disposed one above the other, the upper of said vessels having an inlet at one end for a stream of mixed fluids and a gas outlet at the other, a duct connecting the lower portion of the upper vessel with the lower vessel for transferring liquid components of the stream from the upper vessel to the lower vessel to collect in a relatively shallow body along the length of the lower vessel, an extension depending from the lower vessel and forming a sump in which the heavier separated liquid collects, means connected with the lower vessel for drawing off the lighter separated liquid including control means responsive to the surface level of the lighter liquid for maintaining a gas space within the lower vessel and means connected with the sump for draw-off of the heavier separated liquid.

2. A separator including elongated vessels horizontally disposed one above the other, scrubbers dividing the upper vessel into a gas separating compartment at one end, a gas collecting compartment at the other end, and an intermediate compartment, the upper vessel having an inlet to the gas separating compartment for a stream of mixed fluids and a gas outlet connected with the gas collecting compartment, a duct connecting the intermediate compartment with the lower vessel for transferring liquid components to the stream of the lower vessel to collect in a relatively shallow body along the length of the lower vessel, said lower vessel having a gas space above the shallow body of liquid and said gas space being in connection with the gas separating compartment of the upper vessel, an extension depending from the lower vessel and forming a sump into which liquids separating from the shallow body are adapted to collect, and means connected with the sump for separate draw-off of the separated liquids.

3. A separator including elongated vessels horizontally disposed one above the other, scrubbers dividing the upper vessel into a gas separating compartment at one end, a gas collecting compartment at the other end, and an intermediate compartment, the upper vessel having an inlet to the gas separating compartment for a stream of mixed fluids and a gas outlet connected with the gas collecting compartment, a duct connecting the intermediate compartment with the lower vessel for transferring liquid components of the stream to the lower vessel to collect in a relatively shallow body along the length of the lower vessel, an extension depending from the lower vessel and forming a sump into which liquids separating from the shallow body are adapted to collect, means connected with the sump and lower vessel respectively for separate draw-off of the separated liquids, and means responsive to level of the liquids for controlling said draw-offs to maintain a gas space in the lower vessel, said gas space in the lower vessel being in connection with the gas separating compartment of the upper vessel.

4. A separator including, elongated cylindrical vessels horizontally disposed one above the other, means connected with the upper vessel for admitting a stream of mixed fluids for separation of gaseous and liquid fluids of said stream within said upper vessel, said vessel having an outlet for discharge of the gaseous fluid and said vessel having a bottom portion along which separated liquids flow, said bottom portion having an outlet in connection with an upper portion of the lower vessel through which the separated liquids pass into the lower vessel to eliminate any accumulation of the separated liquids in the upper vessel, said lower vessel having a sump connected with a bottom portion of said lower vessel and into which the heavier of the separated liquids flows while the lighter of the separated liquids collects in a relatively shallow layer on the bottom portion of the lower vessel, means connected with the lower vessel at a point below the top thereof for drawing off the lighter liquid and to maintain a gas space in the lower vessel above said layer of lighter liquid, and means connected with said sump for drawing off the heavier separated liquid.

5. A separator including, elongated cylindrical vessels horizontally disposed one above the other, means connected with the upper vessel for admitting a stream of mixed fluids for separation of gaseous and liquid fluids of said stream within said upper vessel, said vessel having an outlet for discharge of the gaseous fluid and said vessel having a bottom portion along which separated liquids flow, said bottom portion having an outlet in connection with an upper portion of the lower vessel through which the separated liquid fluids pass into the lower vessel and eliminate accumulation of separated liquids in the upper vessel, said lower vessel having a sump connected with a bottom portion of said lower vessel and into which the heavier of the separated liquids flows while the lighter of the separated liquids collects in a relatively shallow layer within the lower portion of the lower vessel, means connected with the lower vessel below the upper portion thereof for drawing off the lighter liquid from said layer, means responsive to said level of the lighter liquid to control drawoff of said lighter liquid through said drawoff means and to maintain a gas space above said layer of lighter liquid, means connected with said sump for drawing off the heavier separated liquid from said sump, and control means responsive to interface level of said separated liquids to control said drawoff means for the heavy liquid independently of the drawoff means for the lighter liquid.

References Cited in the file of this patent

UNITED STATES PATENTS

| Number | Name | Date |
|---|---|---|
| 1,496,090 | Markir et al. | June 3, 1924 |
| 1,897,398 | Raymond | Feb. 14, 1933 |
| 2,009,646 | Brady | July 30, 1935 |
| 2,179,131 | Millard | Nov. 7, 1939 |
| 2,211,282 | McKeever | Aug. 13, 1940 |
| 2,224,345 | Heathman et al. | Dec. 10, 1940 |
| 2,349,944 | Dixon | May 30, 1944 |
| 2,525,154 | Taylor | Oct. 10, 1950 |
| 2,601,904 | Erwin | July 1, 1952 |
| 2,605,780 | Nance | Aug. 5, 1952 |
| 2,657,760 | Glasgow | Nov. 3, 1953 |
| 2,681,150 | Reid | June 15, 1954 |